United States Patent [19]

Light et al.

[11] 3,996,169

[45] Dec. 7, 1976

[54] PERFUME USES OF TRICYCLIC ALCOHOLS AND PROCESSES

[75] Inventors: Kenneth K. Light, Long Branch, N.J.; Edward J. Shuster, Brooklyn, N.Y.; Joaquin F. Vinals, Red Bank; Manfred Hugo Vock, Locust, both of N.J.

[73] Assignee: International Flavors & Fragrances Inc., New York, N.Y.

[22] Filed: Sept. 17, 1975

[21] Appl. No.: 614,078

Related U.S. Application Data

[63] Continuation-in-part of Ser. No. 436,848, Jan. 28, 1974, Pat. No. 3,907,908.

[52] U.S. Cl. .............................. 252/522; 260/617 F
[51] Int. Cl.² ................................................ C11B 9/00
[58] Field of Search .................... 252/522; 260/617

[56] References Cited

FOREIGN PATENTS OR APPLICATIONS

| 788,301 | 3/1973 | Belgium |
| 2,242,913 | 3/1973 | Germany |
| 7,211,760 | 3/1973 | Netherlands |

OTHER PUBLICATIONS

Mirrington et al., J. Org. Chem. 37, No. 18, pp. 2871–2877, 1972.
Corey et al., Science, 166, pp. 178–192, 1969.
Danishevsky et al., Chem. Comm., pp. 1287–1288, 1968.
Umarini et al., P & E.O.R., Sept./Oct. p. 307, 1969.
Dobler et al., Proc. Chem. Soc., p. 383, Dec., 1963.

Primary Examiner—Veronica O'Keefe
Attorney, Agent, or Firm—Arthur L. Liberman; Harold Haidt; Franklin D. Wolffe

[57] ABSTRACT

Processes and compositions for altering, modifying, enhancing (or imparting) the aroma of (or to) consumable products including colognes, perfumes and perfumed articles using as the essential ingredient at least one organic tricyclic alcohol having the formula:

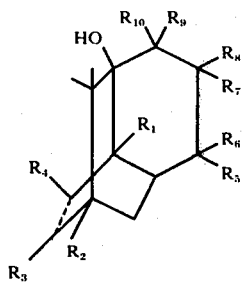

wherein each of $R_1$, $R_2$, $R_3$, $R_4$, $R_5$, $R_6$, $R_7$, $R_8$, $R_9$ and $R_{10}$ is selected from the group consisting of hydrogen and methyl; wherein the dashed line is carbon-carbon single bond or a carbon-carbon double bond; wherein $R_1$ is limited to hydrogen when (i) the dashed line is a carbon-carbon single bond; (ii) $R_2$, $R_3$, $R_4$, $R_6$, $R_7$, $R_8$, $R_9$ and $R_{10}$ is hydrogen and (iii) $R_5$ is hydrogen or methyl and wherein when the dashed line is a carbon-carbon single bond, one of $R_3$ or $R_4$ is hydrogen.

8 Claims, No Drawings

PERFUME USES OF TRICYCLIC ALCOHOLS AND PROCESSES

This application is a continuation-in-part of United States Application for Letters Patent, Ser. No. 436,848, filed in Jan. 28, 1974 (U.S. Pat. No. 3,907,908; issue date, Sept. 23, 1975).

BACKGROUND OF THE INVENTION

Materials which can provide patchouli-like, amber and woody fragrance notes are known in the art of perfumery. Many of the natural materials which provide such fragrance and contribute desired nuances to perfumery compositions are high in cost, vary in quality from one batch to another and/or are generally subject to the usual variations of natural products.

There is accordingly a continuing effort to find synthetic materials which will replace the essential fragrance notes provided by natural essential oils or compositions thereof. Unfortunately, many of these synthetic materials either have the desired nuances only to a relatively small degree or else contribute undesirable or unwanted odor to the compositions. The search for materials which can provide a more refined patchouli-like fragrance has been difficult and relatively costly in the areas of both natural products and synthetic products.

Buchi et al., 83 J. Am. Chem. Soc. 927 (1961), shows the production of a material called "patchoulione" which is stated to be octahydro-1,4,9,9-tetramethyl-3a,7-methanoazulen-5(4H)-one having the structure:

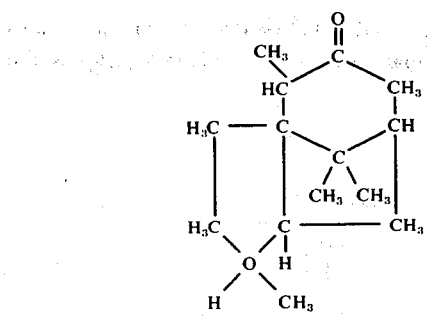

U.S. Pat. No. 3,748,284 issued on July 24, 1973 discloses perhydro derivatives of methanoazulene as having camphoraceous woody fragrances and having the ability to impart this fragrance to perfumed compositions and perfumed articles. The compounds disclosed are:

a. Octahydro-1,4,9,9-tetramethyl-4,7-methanoazulen-3(2H)-one having the structure:

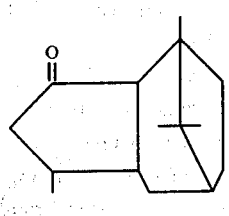

b. Octahydro-1,4,9,9-tetramethyl-4,7-methanoazulen-2(3H)-one having the structure:

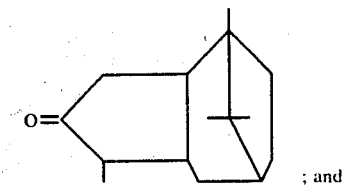

; and c. Octahydro-1,4,9,9-tetramethyl-4,7-methanoazulen-8(7H)-one having the structure:

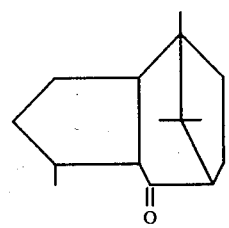

Umarani et al., Sept./Oct. 1969, P. & E. O. R., 307 discloses two compounds relevant to the instant case: "isopatchoulinol" having the structure:

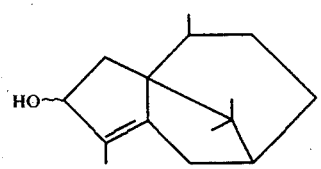

and "patchouli alcohol" having the structure:

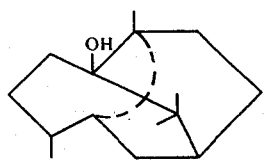

Mirrigton and Schmalzl 37 J. Org. Chem. No. 18, 1972, pages 2871–2877 discloses the isolation of (−) patchouli alcohol having the structure:

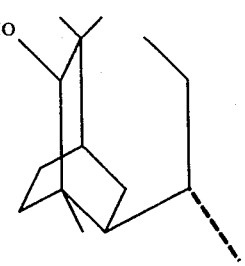

An article by Corey and Wipke entitled "Computer-Assisted Design of Complex Organic Syntheses" appearing in 166 Science 178 (1969) sets forth, interalia, the sequence of reactions leading to compounds having the structures:

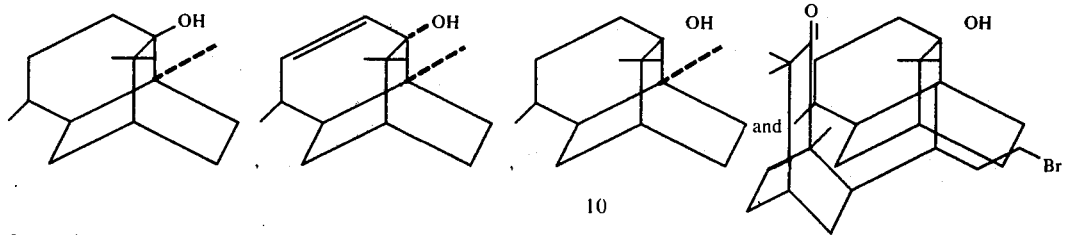

One of these reaction sequences involves performing the reactions:

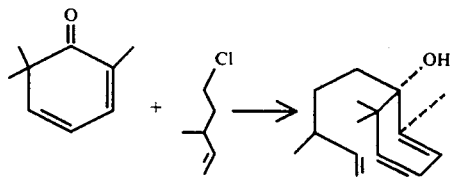 (A)

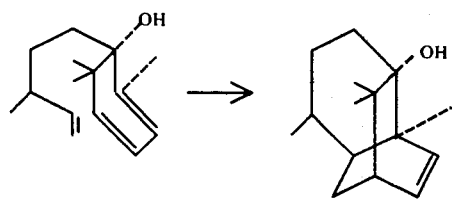 (B)

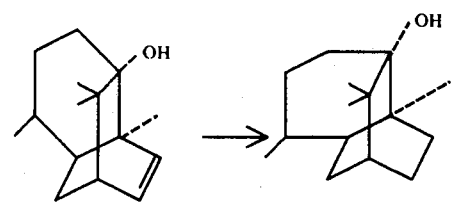 (C)

However, syntheses of methyl homologues and double compound isomers and an analogues patchouli alcohol and dihydropatchouli alcohol have not yet been disclosed in the prior art. Indeed, economic syntheses of patchouli alcohol itself do not appear to be given in the literature.

Danishevsky and Dumas 1968 Chemical Communication, Pages 1287–1288 discloses the synthesis of racemic patchouli alcohol and epi patchouli alcohol having the structure:

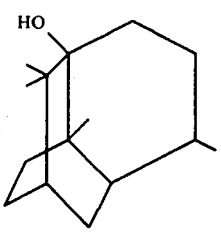

by means of cyclization of a compound having the structure;

The use in perfumery of the compound having the structure:

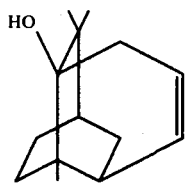

("dehydro-norpatchoulinol") is disclosed in the following patents:
1. Belgium 788,301 issued Mar. 1, 1973
2. German Offenlegungschrift 2,242,913 published Mar. 8, 1973
3. Dutch published Application 72/11760 published Mar. 5, 1973

A product of the reduction of this compound is also disclosed ("norpatchoulinol"). This product has the structure:

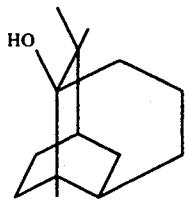

The compounds of our invention have properties considered to be unobvious, unexpected and advantageous with respect to the properties of the above-mentioned prior art compounds.

THE INVENTION

It has now been determined that certain tricyclic alcohols are capable of imparting or enhancing or modifying or altering a variety of fragrances in or to various consumable materials including perfumes, colognes and perfumed articles. Briefly, our invention contemplates altering, modifying, enhancing or imparting fragrances of such consumable materials by adding thereto a small but effective amount of at least one tricyclic alcohol having the structure:

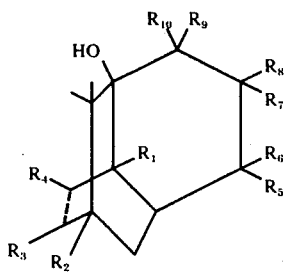

wherein each of $R_1$, $R_2$, $R_3$, $R_4$, $R_5$, $R_6$, $R_7$, $R_8$, $R_9$ and $R_{10}$ is selected from the group consisting of hydrogen and methyl; wherein the dashed line is a carbon-carbon single bond or a carbon-carbon double bond; wherein $R_1$ is limited to hydrogen when (i) the dashed line is a carbon-carbon single; (ii) $R_2$, $R_3$, $R_4$, $R_6$, $R_7$, $R_8$, $R_9$ and $R_{10}$ is hydrogen and (iii) $R_5$ is hydrogen or methyl and wherein when the dashed line is a carbon-carbon single bond, one of $R_3$ or $R_4$ is hydrogen and flavoring and fragrance compositions containing such tricyclic alcohols. The invention also contemplates novel processes for producing such compounds as well as other compounds having the generic structure set forth above wherein the dashed line is a carbon-carbon single bond or a carbon-carbon double bond and each of $R_1$, $R_2$, $R_3$, $R_4$, $R_5$, $R_6$, $R_7$, $R_8$, $R_9$ and $R_{10}$ is the same or different and each represents hydrogen or methyl with the proviso that the dashed line is a carbon-carbon single bond when one of $R_3$ and $R_4$ is hydrogen.

The tricyclic alcohols produced according to the process of our invention, a number of which are used in practicing our invention concerning fragrance compositions, perfumed articles and colognes are actually racemic mixtures rather than individual stereoisomers, such as the case concerning isomers of patchouli alcohol which are so obtained from patchouli oil.

Specific examples of novel products of synthesis which have been found to be useful for the purposes of our invention are as follows:

A. The compound having the structure:

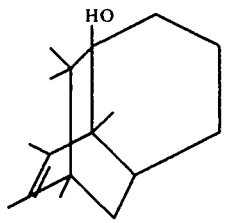

This compound has a warm patchouli-like fragrance aroma.

B.

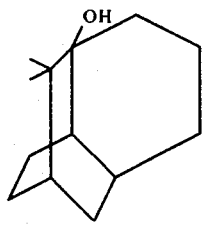

This compound has a warm patchouli fragrance.

The tricyclic alcohols prepared according to the present invention can be obtained by means of two closely related reaction sequences; set forth below:

The first route comprises first intimately admixing a methyl-cyclohexadienone having the structure:

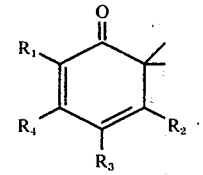

with an acetylenic compound having the structure:

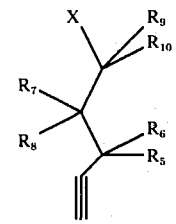

wherein X may be either hydroxyl, bromo and chloro thereby forming a diene compound having the structure:

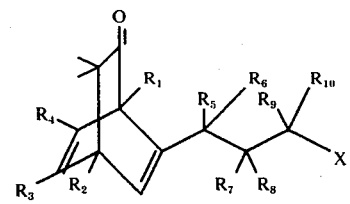

In this reaction, it is best to proceed at a temperature in the range of 200°–260° C with the most preferred temperature being 220° C. The reaction may be carried out in the presence of an inert solvent such as benzene, hexane or cyclohexane (or any other inert solvent) or the reaction may be carried out in the absence of solvent. Although, either the acetylenic compound or the cyclohexadienone may be used in excess, it is preferred to use equimolar quantities of each reactant.

The above-mentioned diene compound is then hydrogenated with hydrogen in the presence of a catalyst such as palladium, platinum, nickel or other suitable hydrogenation catalyst.

The reaction temperature may be from 20°–220° C with a temperature range of 100°–200° C being preferred. The reaction is preferably carried out at superatmospheric pressures and pressures in the range of 1–150 atmoshperes are suitable. Preferred pressures range from 5–150 atmospheres.

The hydrogenation reaction gives rise to a ketone product having the structure:

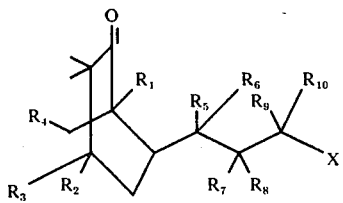

but it is noteworthy that the compound produced is one where the dashed line is a carbon-carbon single bond if one of $R_3$ or $R_4$ is hydrogen and the compound is primarily one where the dashed line is a carbon-carbon double bond if $R_3$ and $R_4$ are both methyl.

When X is halogen, the ketone thus produced may then be immediately cyclized by treating same with an alkali metal selected from the group consisting of sodium, potassium or lithium. The cyclization may be carried out in diethyl ether, tetrahydrofuran or benzene. The reaction temperature preferred is the reflux temperature of the reaction mass at atmospheric pressure and is a function of the solvent used. Thus, for example, when using tetrahydrofuran solvent, the cyclization reaction temperature is approximately 65° C. The reaction can be carried out at temperatures ranging from 0° C up to 100° C. For the cyclization, the mole ratio of ketone to metal is preferably 7:1 although mole ratio of ketone to metal is from 1:1 up to 10:1 may be used.

Prior to cyclization, in the event that X is OH, the ketone must be halogenated with thionyl chloride or any other suitable halogenating agent, for example, thionyl chloride-pyridine complex, phosphorous-trichloride, phosphorous-tri-bromide, aqueous HCl or aqueous HBr. The halogentation reaction may be carried out in the presence or in the absence of an inert solvent such as benzene, toluene, cyclohexane or pyridine. The reaction temperature may range from 20° C up to 100° C with a reaction temperature of 80° C being preferred. The mole ratio of halogenating agent:ketone of 3:1 is preferred when using thionyl chloride and a ratio of 10:1 is preferred when using aqueous HCl and HBr.

The initial reaction may utilize, for example, the following reactants:
a. Acetylenic compounds:
3-Methylpent-4-yn-1-ol
3-Methylpent-4-yn-1-chloride
3-Methylpent-4-yn-1-bromide
Pent-4-yn-1-ol
Pent-4-yn-1-chloride
Pent-4-yn-1-bromide
Cyclohexadienone compounds:
2,6,6-Trimethylcyclohexadien-1-one
2,3,4,5,6,6-Hexamethylcyclohexadien-1-one
2,3,4,6,6-Pentamethylcyclohexadien-1-one
6,6-Dimethylcyclohexadien-1-one
4,5,6,6-Tetramethylcyclohexadien-1-one
2,4,5,6,6-Pentamethylcyclohexadien-1-one When the final cyclization reaction is completed, the reaction mixture is "worked-up" using routine purification procedures including the unit operations of extraction, crystallization, drying and/or distillation.

The individual tricyclic compounds of our invention can be obtained in purer form or in substantially pure form by conventional purification techniques. Thus, the products can be purified and/or isolated by distillation, extraction, crystallization, preparative chromatographic techniques, and the like. It has been found desirable to purify the tricyclic compounds by fractional distillation by vacuum.

It will be appreciated from the present disclosure that the tricyclic compounds and mixtures thereof according to the present invention can be used to alter, vary, fortify, modify, enhance or otherwise improve the aroma of a wide variety of consumable materials, e.g. perfumes, perfumed articles and colognes which are organoleptically sensed.

The terms "alter" and "modify" in their various forms will be understood herein to mean the supplying or imparting of an aroma character or note to an otherwise bland, relatively odorless substance, or augmenting an existing aroma characteristic where the natural aroma is deficient in some regard; or supplementing the existing aroma impression to modify the organoleptic character thereof.

The term "enhance" in its various forms is used herein to mean the intensification of an aroma characteristic or note without the modification of the quality thereof. Thus, "enhancement" of an aroma, means that the enhancement agent does not add any additional aroma nuance.

The tricyclic compounds of our invention can be used to contribute warm, patchouli-like aromas. As olfactory agents the tricyclic compounds of this invention can be formulated into or used as components of a "perfume composition".

The term "perfume composition" is used herein to mean a mixture of organic compounds, including, for example, alcohols, aldehydes, ketones, nitriles, esters, and frequently hydrocarbons which are admixed so that the combined odors of the individual components produce a pleasant or desired fragrance. Such perfume compositions usually contain: (a) the main note of the "bouquet" or foundation-stone of the composition; (b) modifiers which round-off and accompany the main note; (c) fixatives which include odorous substances which lend a particular note to the perfume throughout all stages of evaporation, and substances which retard evaporation; and (d) top-notes which are usually low-boiling fresh smelling materials.

In perfume compositions the individual component will contribute its particular olfactory characteristics, but the overall effect of the perfume composition will be the sum of the effect of each ingredient. Thus, the individual compounds of this invention, or mixtures thereof, can be used to alter the aroma characteristics of a perfume composition, for example, by highlighting or moderating th olfactory reaction contributed by another ingredient in the composition.

The amount of the tricyclic compounds of this invention which will be effective in perfume compositions depends on many factors, including the other ingredients, their amounts and the effects which are desired. It has been found that perfume compositions containing as little as 2 percent of the tricyclic compounds of this invention, or even less, can be used to impart a patchouli scent to soaps, cosmetics, and the other products. The amount employed can range up to 50% or higher and will depend on considerations of cost, nature of the end product, and the effect desired on the finished product and particular fragrance sought.

The tricyclic compounds of this invention can be used alone or in a perfume composition as an olfactory component in detergents and soaps, space ordorants and deodorants; perfumes; colognes; toilet waters; bath salts; hair preparations such as lacquers, brilliantines, pomades, and shampoos; cosmetic preparations such as creams, deodorants, hand lotions, and sun screens; powders such as talcs, dusting powders, face powder, and the like.

Detergents, soaps, space deodorants, odorants, toilet waters, bath salts, hair preparations, cosmetic preparations and powders are grouped within the genus, "perfumed article". When used as an olfactory component of a perfumed article, as little as 0.01 percent of one or more of the tricyclic compounds will suffice to impart a warm patchouli aroma. Generally, no more than 0.5 percent is required.

In addition, the perfume composition can contain a vehicle or carrier for the tricyclic compounds alone or with other ingredients. The vehicle can be a liquid such as an alcohol such as ethanol, a glycol such as propylene glycol, or the like. The carrier can be an absorbent solid such as a gum or components for encapsulating the composition.

The following examples are given to illustrate embodiments of the invention as it is presently preferred to practice it. It will be understood that these examples are illustrative, and the invention is not to be considered as restricted thereto except as indicated in the appended claims.

EXAMPLE I

PREPARATION OF 3,3-DIMETHYL-6-(3-CHLOROPROPYL)-BICYCLO-[2.2.2]OCTA-5,7-DIENE-2-ONE

Into an autoclave, 28 gm. of 6,6-dimethyl cyclohexadiene-1-one, 28 gm. of 5-chloro-1-pentyne and 300 ml of benzene are added. The autoclave is sealed and the reaction mass is heated to 220° C. The reaction is carried out over a period of 4 hours after which time the reaction mass is cooled to 20° C. The reaction mass is then removed from the autoclave and the resultant product is stripped of benzene and distilled at a vapor temperature of 136°–138° C and 3.0–3.2 mm. Hg. pressure. The structure of the resultant product is confirmed by NMR, IR and mass spectral analyses to be 3,3-dimethyl-6-(3-chloro-propyl)-bicyclo-[2.2.2]-octa-5,7-diene-2-one.

EXAMPLE II

PREPARATION OF 3,3-DIMETHYL-6-(3-CHLOROPROPYL)-BICYCLO-[2.2.2]-OCTAN-2-ONE

Into an autoclave are placed 20 gm. of 3,3-dimethyl-6-(3-chloropropyl)-bicyclo-[2.2.2]-octa-5,7-diene-2-one produced by the process of Example I and, in addition, 300 ml ethyl alcohol and 1 gm. of palladium-carbon catalyst. The autoclave is sealed and then charged with hydrogen at a pressure of 200 pounds per square inch. The reaction mass is stirred for a period of 5 hours at a temperature of 100°–115° C during which period the pressure in the autoclave varies from 240 up to 260 pounds per square inch. The autoclave is then cooled and the product is removed and distilled. Two products are obtained. The first has a boiling point of 90°–100° C at 1.5 mm. Hg. pressure and is shown by IR, MS and NMR to be 3,3-dimethyl-6-propyl-bicyclo-[2.2.2]-octane-5-one. The second is the desired material, 3,3-dimethyl-6-(3chloropropyl)-bicyclo-[2.2.2]-octan-2-one with a boiling point of 131° C at 1.5 mm. Hg. pressure weighing 8.2 gms.

EXAMPLE III

PREPARATION OF OCTAHYDRO-9,9-DIMETHYL-1,6-METHANONAPHTHALENE-1-(2H)-OL

Into a 250 ml three-neck flask equipped with stirrer, thermometer and reflux condenser, the following materials are placed:

| | |
|---|---|
| Sodium spheres | 1.5 gms. |
| Tetrahydrofuran | 50.0 ml |
| 3,3-dimethyl-6-(3-chloropropyl)-bicyclo-[2.2.2]-octan-2-one | 1.4 gms. |

The reaction mass is refluxed for a period of 4 hours and allowed to stand overnight. The liquid phase is separated from the sodium spheres. The liquid phase is then washed with 100 ml water and acidified with dilute hydrochloric acid. The resultant material is extracted twice with diethyl ether. The combined ether phases are washed with saturated aqueous NaHCO$_3$ and then dried over anhydrous magnesium sulfate. The solution is stripped of sovent and the remaining residue is separated on a GLC column:

(⅛" × 4', 20% SE-30 (a methyl silicone oil available from Analabs, Inc. of P.O. 501, North Haven, Connecticut 06473); 100°–220° C at 8° C/min.).

The structure of the major product of the reaction (43% by GLC) was shown to be the title material.

Mass spectral analysis is as follows: 41, 55, 84, 97, 133, and 110.

NMR analysis is as follows: 1.06(s,6H), complex signals from 1.0 to 2.1 ppm.

EXAMPLE IV

PREPARATION OF 1,3,3-TRIMETHYL-6-(1-METHYL-3-HYDROXYPROPYL)-BICYCLO-[2.2.2]-OCTA-5,7-DIEN-2-ONE

A solution of 27.2 gm. (0.20 ml) of 2,6,6-trimethyl-cyclohexadien-1-one and 28 gm. (0.28 ml) of 3-methylpent-4-yn-l-ol in 300 cc of benzene is placed in a 2 liter stirred autoclave and heated to 220° C for 5 hours. At the end of this time, GLC shows no trimethylcyclohexadien-1-one remaining and the solvent is removed under vacuum and the residue is distilled to yield about 37 gm. (80%) of the product, 1,3,3-trimethyl-6-(1-methyl-3-hydroxypropyl)-bicyclo-[2.2.2]-octa-5,7-dien-2-one.

EXAMPLE V

PREPARATION OF 1,3,3-TRIMETHYL-6-(1-METHYL-3-HYDROXYPROPYL)-BICYCLO-[2.2.2]-OCTAN-2-ONE

Into a stirred autoclave, 30 gm. (0.13 ml) of 1,3,3-trimethyl-6-(1-methyl-3-hydroxypropyl)-bicyclo-[2.2.2]-octa-5,7-dien-2-one, 0.5 gm. of 5% of palladium-carbon and 300 ml of isopropyl alcohol is added. The autoclave is pressurized to 400 pounds per square inch with hydrogen and heated to 100° C for 6 hours. At the end of this time, the mixture is filtered, stripped of solvent and vacuum distilled, yielding about 27 gm. (90%) of the product, 1,3,3-trimethyl-6-(1-methyl-3-hydroxypropyl)-bicyclo-[2.2.2]-octan-2-one.

EXAMPLE VI

PREPARATION OF 1,3,3-TRIMETHYL-6-(1-METHYL-3-CHLORO-PROPYL)-BICYCLO-[2.2.2]-OCTAN-2-ONE

A mixture of 25 gm. (0.105 mole) of 1,3,3-trimethyl-6-(1-methyl-3-hydroxypropyl)-bicyclo-[2.2.2]-octan-2-one and 40 gm. of thionylchloride is gently refluxed for 2 hours. The excess thionylchloride is stripped off and the residue is distilled to yield about 20 gm. (80%) of the product, 1,3,3-trimethyl-6-(1-methyl-3-chloropropyl)-bicyclo-[2.2.2]-octan-2-one.

EXAMPLE VII

PREPARATION OF PATCHOULI ALCOHOL

A sodium sand is prepared by heating 11.5 gm. of sodium in xylene and stirring. The xylene is decanted and replaced by 300 cc of anhydrous tetrahydrofuran. A solution of 20 gm. (0.078 mole) of 1,3,3-trimethyl-6-(1-methyl-3-chloropropyl)-bicyclo-[2.2.2]-octan-2-one in 50 cc of tetrahydrofuran is added with stirring at room temperature over a 15 minute period. A slight exotherm occured during addition. The solution is brought to reflux and held there for 3 hours. At the end of this time, the solution is decanted from the excess sodium and is acidified with 5% HCl. The excess acid is neutralized by a single wash with saturated sodium bicarbonate solution. The solution is dried over magnesium sulfate, filtered and stripped, yielding a residue which is recrystallized from hexane to yield about 10 gm. (50%) of racemic patchouli alcohol, mp 39°–40° having the structure:

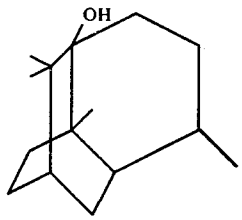

EXAMPLE VIII

PERFUME FORMULATION
The following "woody cologne" perfume formulation is prepared:

| Ingredients | Parts by Weight |
|---|---|
| Bergamot oil | 150 |
| Orange oil | 200 |
| Lemon oil | 50 |
| Eugenol | 10 |
| 4-(4-methyl-4-hydroxy amyl) Δ³ cyclohexene carboxaldehyde | 40 |
| Ylang | 2 |
| Petitgrain Paraguay | 10 |
| Gamma methyl ionone | 20 |
| 3a-Methyl-dodecahydro-6,6,9a-trimethylnaphtho-(2,1-b) furan | 5 |
| Product produced by reaction of acetic anhydride, polyphosphoric acid and 1,5,9-trimethyl cyclododecatriene-1,5,9 according to the process of Example I of U.S. Patent 3,718,697 | 5 |
| Octahydro-9,9-dimethyl-1,6-methano-naphthalene-1-(2H)-ol produced according to Example III | 15 |

Octahydro-9,9-dimethyl-1,6-methanonaphthalene-1-(2H)-ol imparts a warm patchouli-like character to this "woody cologne" composition.

EXAMPLE IX

PREPARATION OF A SOAP COMPOSITION

A total of 100 gm. of soap chips produced from unperfumed sodium base toilet soap made from tallow and coconut oil are mixed with 1 gm. of the perfume composition set forth in Example VIII until a substantially homogeneous composition is cotained. The soap composition manifests a characteristic "woody cologne" aroma having a warm patchouli-like character.

EXAMPLE X

PREPARATION OF A SOAP COMPOSITION

A total of 100 gm. of soap chips produced from unperfumed sodium base toilet soap made from tallow and coconut oil is mixed with 1 gm. of octahydro-9,9-dimethyl-1-methanonaphthalene-1-(2H)-ol until a substantially homogeneous composition is obtained. The soap composition manifests a warm patchouli-like character.

EXAMPLE XI

PREPARATION OF A DETERGENT COMPOSITION

A total of 100 gm. of a detergent powder sold under the trademark "RINSO" are mixed with 0.15 gm. of a perfume composition containing the mixture obtained in Example VIII until a substantially homogeneous composition having a "woody cologne" fragrance with a warm patchouli-like character is obtained.

EXAMPLE XII

PREPARATION OF A COSMETIC BASE

A cosmetic powder is prepared by mixing 100 gm. of talcum powder with 0.25 gm. of the perfume composition of Example VIII in a ball mill. A second cosmetic powder is similarly prepared except that the mixture produced in Example VIII is replaced with the product produced in Example III, octahydro-9,9-dimethyl-1,6-methanonaphthalene-1-(2H)-ol. The cosmetic powder containing the material of Example VIII has a "woody cologne" fragrance with a warm patchouli-like character. The cosmetic powder produced using this material of Example III has a warm natural patchouli-like character.

EXAMPLE XIII

LIQUID DETERGENT CONTAINING OCTAHYDRO-9,9-DIMETHYL-1,6-METHANONAPTHALENE-1-(2H)-CL

Concentrated liquid detergents with a patchouli-like odor containing 0.2%, 0.5% and 1.2% of the product produced in accordance with the process of Example III, octahydro-9,9-dimthyl-1,6-methanonaphthalene-1-(2H)-ol, are prepared by adding the appropriate quantity of octahydro-9,9-dimethyl-1,6-methano-naphthalene-1-(2H)-ol to the liquid detergent known as P-87. The patchouli aroma of the liquid detergent increases with increasing concentration of the octahydro-9,9-dimethyl-1,6-methanonaphthalene-1-(2H)-ol of this invention.

EXAMPLE XIV

PREPARATION OF COLOGNE AND HANDKERCHIEF PERFUME

The composition of Example VIII is incorporated in a cologne having a concentration of 2.5% in 85% aqueous ethanol; and into a handkerchief perfume in a concentration of 20% (in 95% ethanol). The use of the composition of Example VIII affords a distinct and definite "woody cologne" aroma having a warm patchouli-like character to the handkerchief perfume and to the cologne.

EXAMPLE XV

COLOGNE AND HANDKERCHIEF PERFUME

The octahydro-9,9-dimethyl-1,6-methanonaphthalene-1-(2H)-ol produced by the process of Example III is incorporated into a cologne having a concentration of 2.5% in 85% ethanol; and into a handkerchief perfume in a concentration of 10% (in 95% ethanol). The octahydro-9,9-dimethyl-1,6-methanonaphthalene-1-(2H)-ol produced in Example III affords a distinct and definite warm patchouli-like aroma to the handkerchief perfume and to the cologne.

EXAMPLE XVI

SYNTHESIS OF DIHYDRONORPATCHOULINOL

Into a 500 ml flask fitted with a condenser, stirrer, thermometer and nitrogen inlet tube, the following materials are placed:

| Ingredients | Parts by Weight |
|---|---|
| Xylene | 15 ml |
| Sodium | 7.5 gm. |

The mixture is heated to 90° C while stirring vigorously. When the sodium is completely dispersed in fine particles, the stirring is ceased and the heat source is removed after which time the mixture is cooled using an ice bath. When the sodium dispersion temperature reaches 30° C, the xylene is decanted and replaced with 200 ml of tetrahydrofuran. The suspension is heated to reflux and 11 gm. of 1,3,3-trimethyl-6-(3-chloropropyl)-bicyclo-[2.2.2]-octan-2-one are added. The reaction mass is then maintained at reflux for a period of 3 hours with moderate stirring. The sodium remains dispersed until 5 minutes before reflux is discontinued where upon it coagulates into a large ball. The heat source is then removed and stirring is ceased. The reaction mass is decanted from the sodium, acidified to a pH of 3 with 5% of hydrochloric acid and then neutralized to a pH 7 with a sodium bicarbonate solution. The organic layer is separated from the aqueous layer, and the aqueous layer is extracted four times with 100 ml portions of diethyl ether and vacuum distilled at a temperature of 120° C and a pressure of 0.6 mm. Hg. Mass spectral, IR and NMR analyses yield the data that the major product, obtained in 64% yield, is the title compound having the structure:

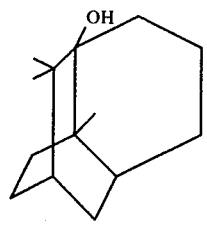

Mass spectral analysis is as follows: m/e = 208 (Parent Peak), 41, 84, 124, 81.

NMR Analysis is as follows: 0.83(s,3H), 1.07(s,3H), 1.10(s,3H), 1.0–2.0 (Complex signals, 14H) ppm.

EXAMPLE XVII

COMPARISON OF OCTAHYDRO-9,9-DIMETHYL-1,6-METHANONAPTHALEN-1-(2H)-OL WITH PATCHOULI ALCOHOL

Comparisons of (i) octahydro-9,9-dimethyl-1,6-methanonapthalen-1-(2H)-ol having the structure:

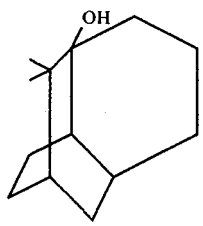

produced by the process of Example III herein, and (ii) patchouli alcohol prepared according to the process of Mirrington et al, cited supra, are carried out by comparing the aromas in methyl alcohol solution, in soap and in detergents as follows:

Neat: A 10% solution of the subject aroma chemicals are prepared in ethyl alcohol. The octahydro-9,9-dimethyl-1,6-methanonapthalen1-(2H)-ol is stronger than patchouli alcohol and has a little of the earthy character of the natural alcohols but it also has a "dried fruit" slightly burnt sugar note not found in patchouli. It is much more earthy than patchouli alcohol, and less sweet.

Soap: (0.5%) The octahydrodimethylmethanonapthalenol is stronger than patchouli alcohol and covers the soap base quite well. The earthy character is predominant in the soap. The patchouli alcohol does not cover the soap base as well as the octahydrodimethylmethanonapthalenol.

Detergent: (0.5%) In this case however, the patchouli alcohol is stronger and quite clearly observed in the powdered detergent. The octahydrodimethylmethanonapthalenol is weaker and can hardly be observed in the detergent.

As a result of the above comparisons it is concluded that given the properties of patchouli alcohol, the properties of octahydrodimethylmethanonapthenol of the instant application are advantageous, unexpected and unobvious insofar as its use in perfume formulations and soap is concerned.

EXAMPLE XVIII

COMPARISON

Octahydrodimethylmethanonapthalenol prepared in accordance with the process of Example III herein is compared with (i) patchouli alcohol prepared in accordance with the process of Mirrington et al., "J. Org. Chem.", Vol. 37, No. 18 (1972), pages 2871–77 and (ii) dihydronorpatchoulinol prepared in accordance with the process of Example XVI and having the structure:

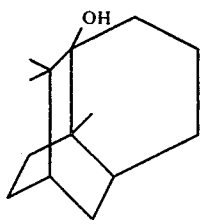

as to odor quality, stability, strength and character, thusly:

i. Side-by-side comparison of patchouli alcohol without diluents added with dihydronorpatchoulinol without diluents added with octahydrodimethylmethanonapthalenol without diluents added;

ii. Preparing solutions of patchouli alcohol, dihydrononorpatchoulinol and octahydrodimethylmethanonapthalenol and evaluating the materials on blotter strips, side-by-side; and iii. Incorporating each of patchouli alcohol, dihydronorpatchoulinol and octahydrodimethylmethanonapthalenol, separately, into the following perfume formula:

| Ingredients | Parts by Weight |
| --- | --- |
| Bargamot oil | 150 |
| Orange oil | 200 |
| Lemon oil | 50 |
| Eugenol | 10 |
| 4-(4-methyl-4-hydroxy amyl) $\Delta^3$ cyclohexene carboxaldehyde | 40 |
| Ylang | 2 |
| Petitgrain Paraguay | 10 |
| Gamma methyl ionone | 20 |
| 3a-Methyl-dodecahydro-6,6,9a-trimethylnaphtho-(2,1-b) furan | 5 |
| Product produced by reaction of acetic anhydride, polyphosphoric acid and 1,5,9-trimethyl cyclododecatriene-1,5,9 according to the process of Example I of U.S. Patent 3,718,697 | 5 |
| Test materials (either of patchouli alcohol, dihydronorpatchoulinol or octahydrodimethylmethanonaphthalenol) | 15 |

When performing tests (i) and (ii) set forth above, dihydronorpatchoulinol is somewhat stronger than either of patchouli alcohol or octahydrodimethylmethanonapthalenol when freshly dipped, but on dry-out the dihydronorpatchoulinol is the weakest of the three alcohols. Dihydronorpatchoulinol has weak camphor-fenchyl alcohol-like notes and a weak sweet carrot note. Octahydrodimethylmethanonapthalenol is stronger than patchouli alcohol on fresh dipping and on dry-out and has little of the earthy character of natural patchouli alcohol but also has a "dried-fruit" slightly burnt sugar note not found in patchouli alcohol. It is also much more earthy than patchouli alcohol is and is less sweet. In performing test (iii) above, in a woody cologne formulation, the most outstanding compound of the three is the octahydrodimethylmethanonapthalenol which imparts a warm patchouli-like character to this woody cologne composition. Both the patchouli alcohol and the dihydronorpatchoulinol are weaker in the perfume composition and at the same rates do not give the same intense warm patchouli-like character that the octahydrodimethylmethanonapthalenol gives to this formulation.

As a result of the tests performed, it is concluded that the octahydrodimethylmethanonapthalenol has properties which, when compared with patchouli alcohol and dihydronorpatchoulinol are particularly and unexpectedly advantageous for the production of perfume essences having warm, patchouli-like fragrance characteristics, and such properties of octahydrodimethylmethanonapthalenol are not obvious and they are unexpectedly advantageous.

What is claimed is:

1. A fragrance modifying composition comprising a tricyclic compound having the structure:

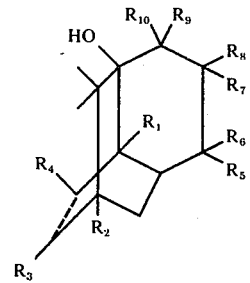

wherein each of $R_1$, $R_2$, $R_3$, $R_4$, $R_5$, $R_6$, $R_7$, $R_8$, $R_9$ and $R_{10}$ is selected from the group consisting of hydrogen and methyl; wherein the dashed line is a carbon-carbon single bond or a carbon-carbon double bond; wherein $R_1$ is limited to hydrogen when (i) the dashed line is a carbon-carbon single bond, (ii) $R_2$, $R_3$, $R_4$, $R_6$, $R_7$, $R_8$, $R_9$ and $R_{10}$ is hydrogen and (iii) $R_5$ is hydrogen or methyl; and wherein when the dashed line is a carbon-carbon single bond, one of $R_3$ or $R_4$ is hydrogen, and an auxiliary perfume ingredient.

2. A perfume composition comprising a tricyclic compound having the structure:

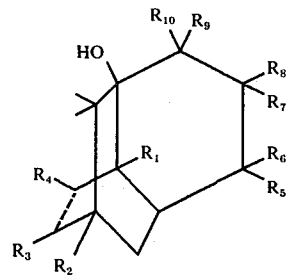

wherein each of $R_1$, $R_2$, $R_3$, $R_4$, $R_5$, $R_6$, $R_7$, $R_8$, $R_9$ and $R_{10}$ is selected from the group consisting of hydrogen and methyl; wherein the dashed line is a carbon-carbon single bond or a carbon-carbon double bond; wherein $R_1$ is limited to hydrogen when (i) the dashed line is a carbon-carbon single bond, (ii) $R_2$, $R_3$, $R_4$, $R_6$, $R_7$, $R_8$, $R_9$ and $R_{10}$ is hydrogen and (iii) $R_5$ is hydrogen or methyl; and wherein when the dashed line is a carbon-carbon single bond, one of $R_3$ or $R_4$ is hydrogen, and at least one adjuvant selected from the group consisting of natural perfume oil, synthetic perfume oil, alcohols, aldehydes, ketones, esters and lactones.

3. A cologne composition comprising a tricyclic compound having the structure:

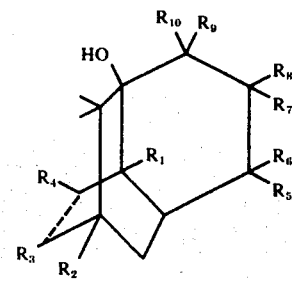

wherein each of $R_1$, $R_2$, $R_3$, $R_4$, $R_5$, $R_6$, $R_7$, $R_8$, $R_9$ and $R_{10}$ is selected from the group consisting of hydrogen and methyl; wherein the dashed line is a carbon-carbon single bond or a carbon-carbon double bond; wherein $R_1$ is limited to hydrogen when (i) the dashed line is a carbon-carbon single bond, (ii) $R_2$, $R_3$, $R_4$, $R_6$, $R_7$, $R_8$, $R_9$ and $R_{10}$ is hydrogen and (iii) $R_5$ is hydrogen or methyl; and wherein when the dashed line is a carbon-carbon single bond, one of $R_3$ or $R_4$ is hydrogen, ethanol and water.

4. The cologne composition of claim 3 comprising as the tricyclic compound octahydro-9,9-dimethyl-1,6-methanonaphthalen-1(2H)-ol, ethanol and water.

5. A fragrance modifying composition consisting essentially of from 2% up to 50% by weight of said composition of a compound selected from the group consisting of
  i. octahydro-9,9-dimethyl-1,6-methanonaphthalene-1(2H)-ol having the structure:

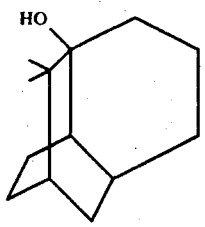

and ii. the compound having the structure:

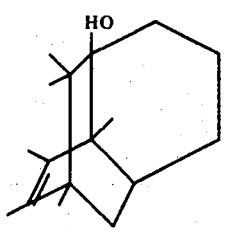

the remainder of said composition being at least one adjuvant selected from the group consisting of natural perfume oil, synthetic perfume oil, alcohols, aldehydes, ketones, esters, hydrocarbons and nitriles.

6. The composition of claim 5 wherein the tricyclic compound is octahydro-9,9-dimethyl-1,6-methanonaphthalene-1(2H)-ol having the structure:

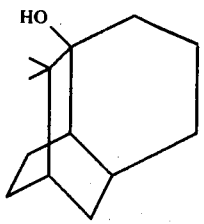

7. The composition of claim 5 wherein the tricyclic compound is a compound having the structure:

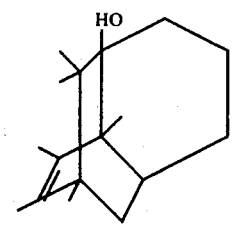

8. A cologne composition comprising a tricyclic compound having a structure selected from the group consisting of:

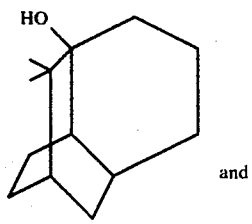

and

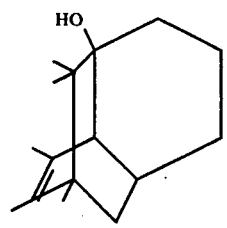

ethanol and water.

* * * * *